(12) United States Patent
McPherson

(10) Patent No.: US 8,580,021 B1
(45) Date of Patent: Nov. 12, 2013

(54) PORTABLE AIR SCRUBBER DEVICE

(76) Inventor: Florencio A. McPherson, Brooklyn, NY (US)

(*) Notice: Subject to any disclaimer, the term of this patent is extended or adjusted under 35 U.S.C. 154(b) by 321 days.

(21) Appl. No.: 13/171,209

(22) Filed: Jun. 28, 2011

(51) Int. Cl.
*B01D 47/06* (2006.01)

(52) U.S. Cl.
USPC .................. 96/271; 96/273; 96/280; 96/322

(58) Field of Classification Search
USPC ............................ 95/270, 271, 273, 280, 322
See application file for complete search history.

(56) References Cited

U.S. PATENT DOCUMENTS

| | | | | |
|---|---|---|---|---|
| 537,509 | A * | 4/1895 | Wardle et al. | 261/76 |
| 1,128,548 | A * | 2/1915 | Sykes | 96/271 |
| 2,557,419 | A * | 6/1951 | Edwards | 96/265 |
| 2,792,905 | A | 5/1957 | Forrest | |
| 2,830,673 | A * | 4/1958 | Bungas | 96/240 |
| 3,260,036 | A * | 7/1966 | De Bellis | 96/280 |
| 3,572,264 | A * | 3/1971 | Mercer | 110/215 |
| 3,785,126 | A * | 1/1974 | Smitherman | 96/244 |
| 3,989,488 | A | 11/1976 | Wisting | |
| 4,012,208 | A * | 3/1977 | Arnim et al. | 96/258 |
| 5,395,408 | A * | 3/1995 | Zeritis | 261/121.1 |
| 5,560,756 | A * | 10/1996 | Zeritis | 96/249 |
| 5,762,663 | A | 6/1998 | Asada | |
| 7,559,982 | B2 | 7/2009 | Arai | |
| 2005/0284300 | A1 * | 12/2005 | Marusic | 96/271 |

* cited by examiner

*Primary Examiner* — Duane Smith
*Assistant Examiner* — Joubert X Glover

(57) ABSTRACT

The portable air scrubber device provides for removably covering an existing chimney with the chimney cap. The axial fan forces airflow through the device hoses, removable filters, flex joints, and tank. The hose flex joints allow adaptation to various chimneys and roofs. The device may be disassembled into its various components such as the hoses, the fan housing, the chimney cap, the flex joints, and the tank components, thereby aiding portability. Liquid filtration media used for filtration may include water, water and glycol mix, and other additives that aid in air filtration and particulate removal. Air once passed through the filters and sprayed by the liquid filtration media may exit the top section holes. Excessive liquid filtration media may also exit the top section holes.

2 Claims, 5 Drawing Sheets

PORTABLE AIR SCRUBBER DEVICE

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

The need for scrubbing air from a variety of situations and conditions is well established, whether for overall air quality in our environment or simply for quality of immediate air that must be breathed by humans and animals. Various air purification and scrubbing apparatus exist, many of which are quite large and installed in heavy industrial applications. What has been needed is a basic and effective air scrubber that removes smoke and particulates, one that can be portably applied and removed, and one that uses readily available liquid filtration media. The present device provides for this need.

FIELD OF THE INVENTION

The portable air scrubber device relates to air purification devices and more especially to a portable air scrubber device.

SUMMARY OF THE INVENTION

The general purpose of the portable air scrubber device, described subsequently in greater detail, is to provide a portable air scrubber device which has many novel features that result in an improved portable air scrubber device which is not anticipated, rendered obvious, suggested, or even implied by prior art, either alone or in combination thereof.

To attain this, the portable air scrubber device provides for removably covering an existing chimney. The chimney cap is removably placed upon a chimney. The axial fan that forces airflow through the device hoses, removable filters, flex joints, and tank may draw through the chimney cap or may force air laterally from the chimney cap into the horizontal hose. The hose flex joints allow adaptation to various chimneys and roofs. The device may be disassembled into its various components such as the hoses, the fan housing, the chimney cap, the flex joints, and the tank components, thereby aiding portability. Liquid filtration media used for filtration may include water, water and glycol mix, and other additives that aid in air filtration and particulate removal. Air once passed through the filters and sprayed by the liquid filtration media may exit the top section holes. Excessive liquid filtration media may also exit the top section holes. The mesh removably disposed atop the large tank top section may be of various permeable solid meshes and allows rain water to be gathered in the large tank. Excessive water may overflow through the holes and to the mat that absorbs and slows water flow to a given drain. Water may be carried to the small tank or may also be ducted. More than one type of spray mechanism may be used, including electrically powered and even manually pressurized. The illustrated embodiment provides for a user to manually pressurize the canister by the hand pump for misting head function.

The most complete embodiment of the device may include both the large and small tank. A more basic embodiment of the device may include only the small tank, with the small tank having a top and bottom section likened to the large tank.

Additionally, the device may be used in a myriad, sometimes with slightly different features but still relying upon the basic design of the device. For example, firefighters can use the device to exhaust and reduce smoke in a room or structure either when or before they enter. Firefighters can thereby see better to help the needy and also prevent all involved from being overcome by smoke. Extension cords and generators may be used in conjunction with the device to ensure best fan operation.

Also, the hose may be extended to capture smoke and other airborne contaminants and to transfer same to other areas and/or to the filtration capabilities of the device.

The device may be installed in conjunction with or attached to or within various towers and smokestacks and the like in order to scrub their outputs to alleviate airborne toxins. As many people are affected by such toxins, and some are especially sensitive and sickened by same, the benefits of the device become more obvious. The device may cap a tower and may also be installed inline within the tower. Additionally, various adapters may be used in conjunction with the device in order to facilitate tower installation. Cranes may be used for taller or more difficult tower installations. Various cushioning devices, even rubber balls, may be used to absorb movement and shaking of the device. The device and hoses may be angled and hinged for best application and servicing.

Thus has been broadly outlined the more important features of the improved portable air scrubber device so that the detailed description thereof that follows may be better understood and in order that the present contribution to the art may be better appreciated.

An object of the portable air scrubber device is to scrub smoke from air.

Another object of the portable air scrubber device is to scrub particulates from air.

A further object of the portable air scrubber device is to provide portability.

An added object of the portable air scrubber device is to use readily available filtration media.

And, an object of the portable air scrubber device is to use both solid and liquid filtration media.

Still another object of the portable air scrubber device is to provide for easy cleaning.

A further object of the portable air scrubber device is to provide for easy cleaning.

These together with additional objects, features and advantages of the improved portable air scrubber device will be readily apparent to those of ordinary skill in the art upon reading the following detailed description of presently preferred, but nonetheless illustrative, embodiments of the improved portable air scrubber device when taken in conjunction with the accompanying drawings.

DETAILED DESCRIPTION OF THE DRAWINGS

With reference now to the drawings, and in particular FIGS. 1 through 4 thereof, the principles and concepts of the portable air scrubber device generally designated by the reference number 10 will be described.

Figure 3A:
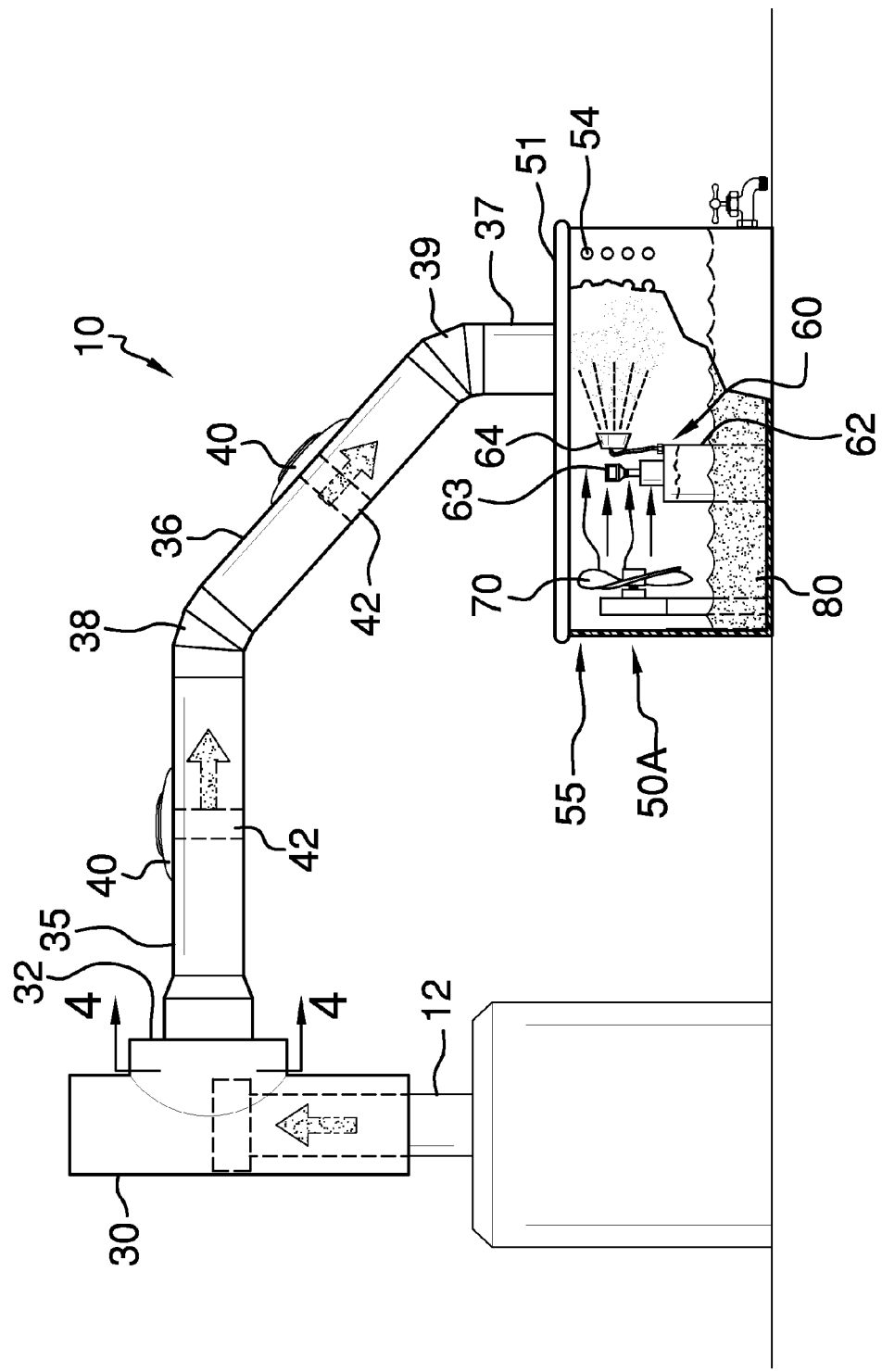
FIG. 3A is an in-use lateral elevation partial cross sectional view.
Figure 3B:
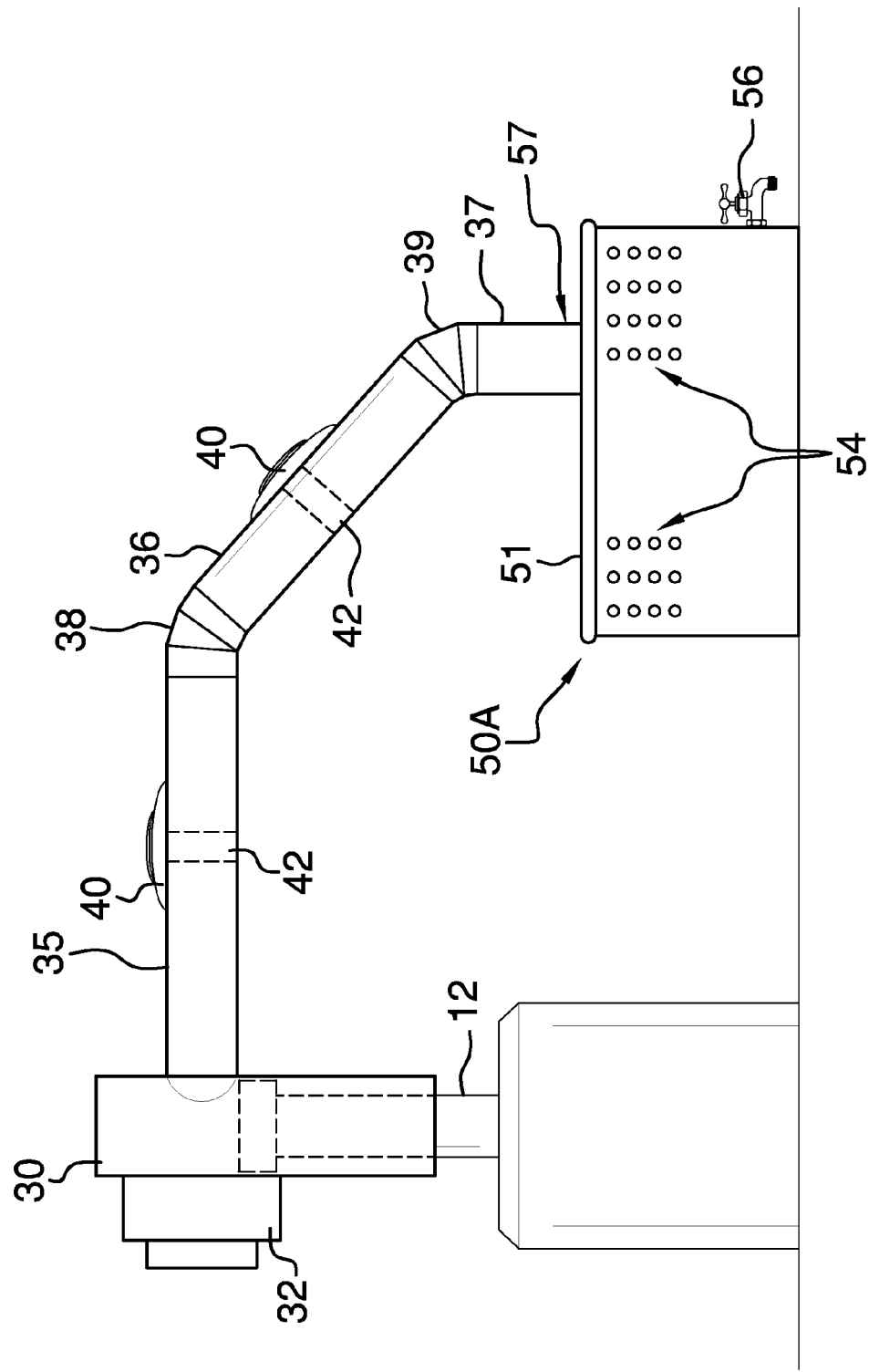
FIG. 3B is an in-use lateral elevation view.

Referring to FIG. 3B, the device 10 partially comprises the cylindrical chimney cap 30 removably fitted atop an existing chimney 12.

Figure 2:
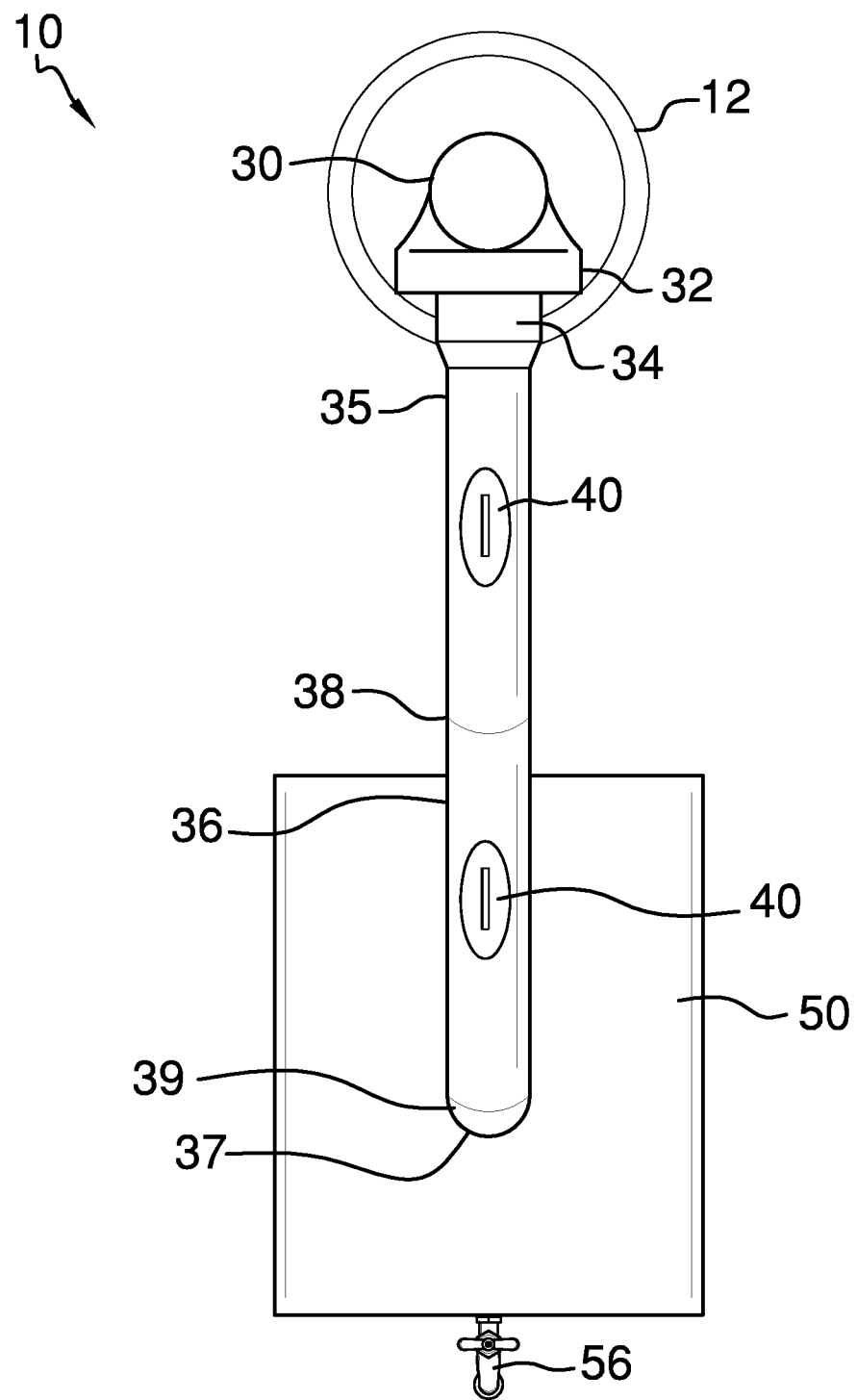
FIG. 2 is an in-use top plan view.

Referring to FIG. 2, the cylindrical fan housing 32 is removably affixed laterally to the chimney cap 30.

Figure 4:
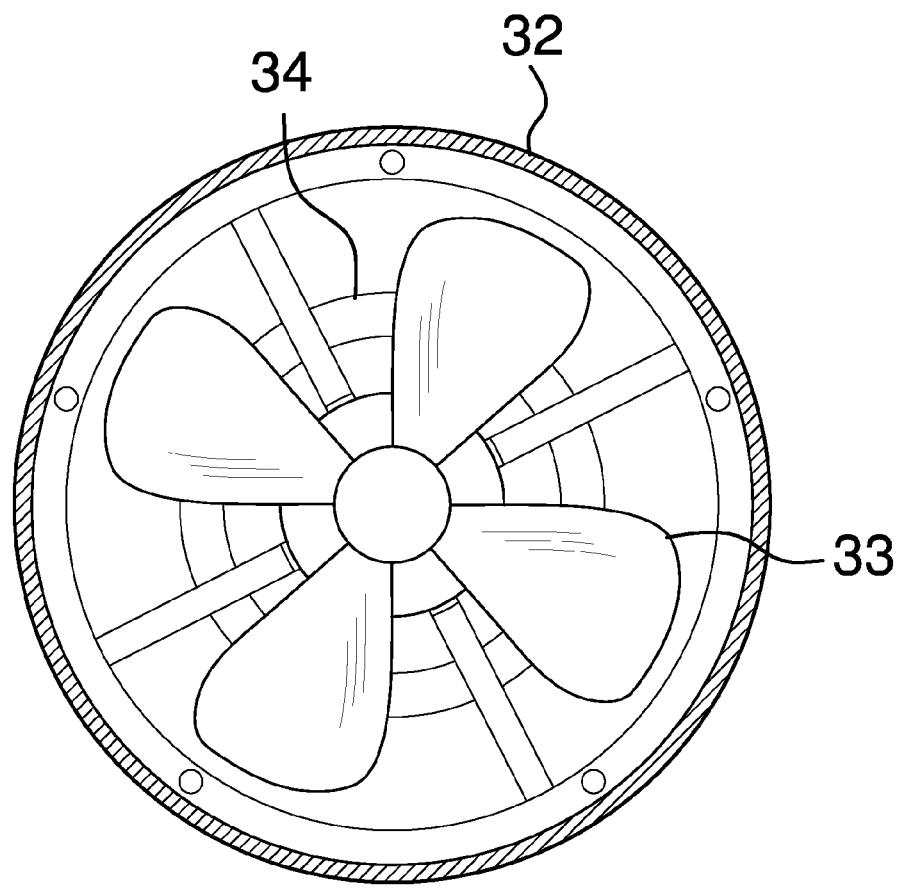
FIG. 4 is a cross sectional view of the axial fan

Referring to FIG. 4, the axial fan 33 is disposed within the fan housing 32.

Referring again to FIG. 2, the diameter reduction 34 is removably extended laterally from the fan housing 32.

Referring again to FIG. 3B, the horizontal hose 35 is removably extended from the diameter reduction 34. An access 40 is disposed within the horizontal hose 35. A removable filter 42 is disposed within the horizontal hose 35 at the access 40. A first flex joint 38 is removably disposed laterally within the horizontal hose 35. A second hose 36 is removably extended from the first flex joint 38. A second flex joint 39 is removably extended from the second hose 36. A connection hose 37 is removably extended from the second flex joint 39.

Figure 1:
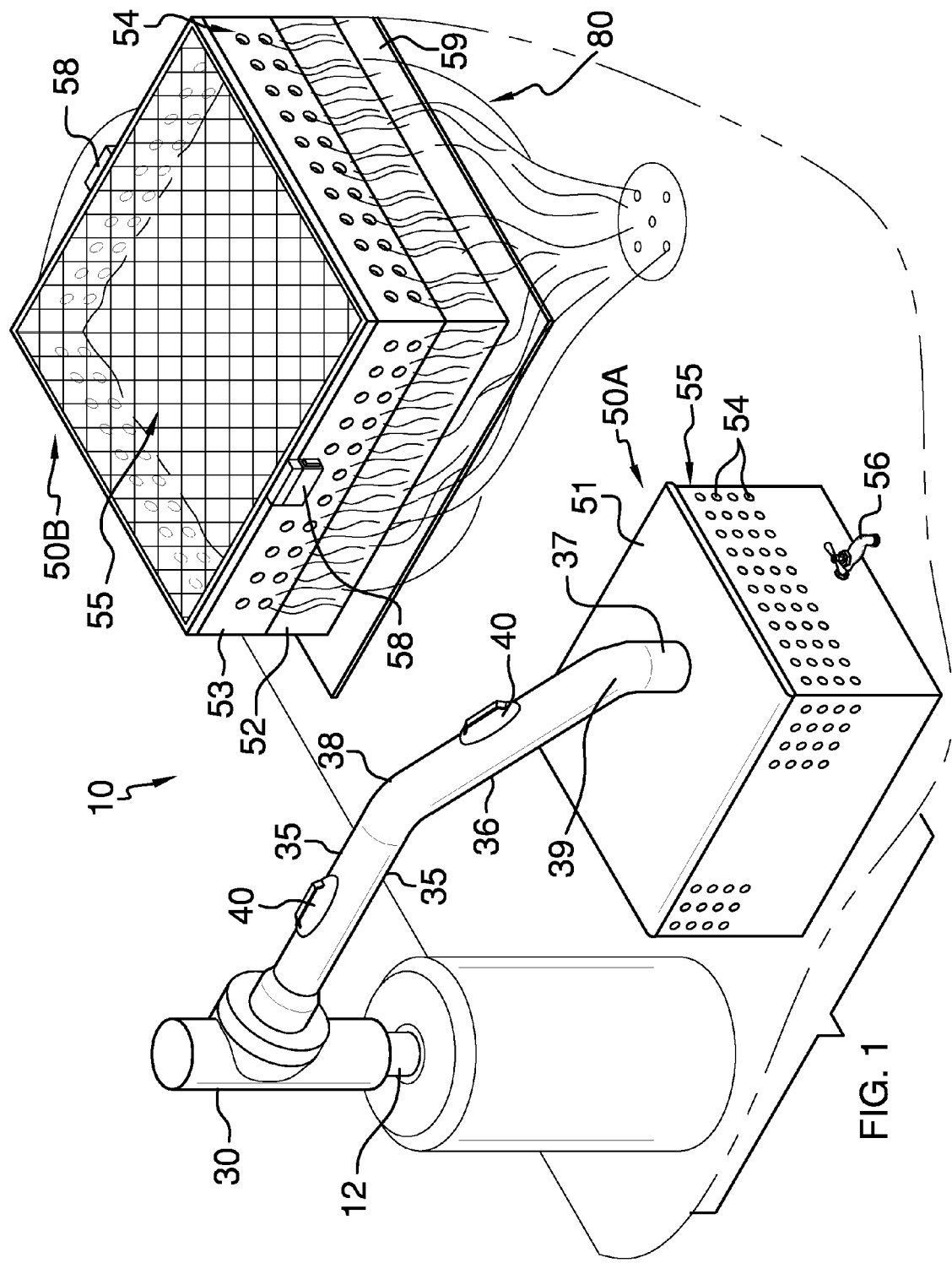
FIG. 1 is an in-use perspective view.

Referring to FIG. 1, the small tank 50A has a horizontally disposed removable top 51 having a substantially laterally disposed inlet 57 connected to the connection hose 37. The plurality of spaced apart holes 54 is disposed upwardly around the small tank 50A. The drain valve 56 is disposed laterally and downwardly. The replaceable liquid filtration medium 80 is used and may include liquids resistance to freezing and liquids that are superior in scrubbing air. The fan 70 is spaced apart from the top 51 inlet 57. The fan 70 is directed toward the inlet 57. The spray mechanism 60 is disposed between the fan 70 and the inlet 57. The spray mechanism 60 comprises a canister 62 disposed within the liquid filtration medium 80, the manually operated hand pump 63 pressurizing the canister 62, and the misting head 64 disposed atop the canister 62. The misting head 64 is directed toward the inlet 57. The large tank 50B is disposed in proximity to the small tank 50A. The absorbent mat 59 is disposed beneath the large tank 50B and slows water overflow from the large tank 50B to a given area or drain, for example. The removable mesh 55 is disposed atop the top section. A pair of opposed latches 58 removably secures the mesh 55 to the top section 53. A plurality of spaced apart laterally disposed holes 54 is within the top section 53. The bottom section 52 is removably disposed below the top section 53. Unclean air entering the chimney cap 12 is forced through the hoses and flex joints and into the small tank 50A by the axial fan 33. The air is scrubbed by a flow of mist from the misting head 64 and the fan 70. Air impurities thereby settle into the liquid filtration medium 80 and scrubbed air exits the holes 54.

Referring to FIG. 3A and again to FIG. 1, a plurality of spaced apart laterally disposed holes 54 are within the top section 53. A bottom section 52 is removably disposed below the top section 53. The bottom section 52 further comprises a replaceable liquid filtration medium 80, a laterally and downwardly disposed drain valve 56, and a fan 70 spaced apart from the top 50 inlet 57. The fan 70 is directed toward the top 50 inlet 57. A spray mechanism 60 is disposed between the fan 70 and the inlet 57. The spray mechanism 60 partially comprises a canister 62 disposed within the liquid filtration medium 80, and a misting head 64 disposed atop the canister 62. The misting head 64 is directed toward the inlet 57, whereby the unclean air entering the chimney cap 30 is forced through the hoses and flex joints and into the tank 50 by the axial fan 33. The air is scrubbed by a flow of mist from the misting head 64 and the fan 70.

The air exits the holes 54, and the air impurities are thereby settled into the liquid filtration medium 80 that may be overflowed through the top section 53 holes 54 and drained from the drain valve 56.

Referring again to FIG. 3A, the fan housing 32 with axial fan 33 is disposed inline between the chimney cap 30 and the horizontal hose 35, thereby drawing from the existing chimney 12 and forcing dirty air through the hoses, filters, and tank 50. Scrubbed air exits the top section 53 holes 54.

Referring again to FIG. 3B, the fan housing 32 with axial fan 33 is disposed on the chimney cap 30 diametrically from the horizontal hose 35, and thereby pushes air through the hoses, filters, and tank 50. Scrubbed air exits the top section 53 holes 54.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the portable air scrubber device may be used.

What is claimed is:

1. A portable air scrubber device comprising, in combination:
    a cylindrical chimney cap removably fitted atop an existing chimney;
    a cylindrical fan housing removably affixed laterally to the chimney cap;
    an axial fan disposed within the fan housing;
    a diameter reduction removably extended laterally from the fan housing;
    a horizontal hose removably extended from the diameter reduction;
    an access disposed within the horizontal hose;
    a removable filter disposed within the horizontal hose at the access;
    a first flex joint removably disposed laterally within the horizontal hose;
    a second hose removably extended from the flex joint;
    a second flex joint removably extended from the second hose;
    a connection hose removably extended from the second flex joint;
    a tank having a horizontal removable top, having a substantially laterally disposed inlet connected to the connection hose;
        a top section disposed below the removable top;
        a removable mesh disposed between the top section and the removable top;
        a pair of opposed latches removably securing the top to the top section;
        a plurality of spaced apart laterally disposed holes within the top section;
        a bottom section removably disposed below the top section, the bottom section further comprising:
            a replaceable liquid filtration medium;
            a laterally and downwardly disposed drain valve;
            a fan removably spaced apart from the top inlet, the fan directed toward the top inlet;
            a spray mechanism removably disposed between the fan and the inlet, the spray mechanism comprising:
                a canister disposed within the liquid filtration medium;

a misting head disposed atop the canister, the misting head directed toward the inlet;

whereby unclean air entering the chimney cap is forced through the hoses and flex joints and into the tank by the axial fan, the air scrubbed by a flow of mist from the misting head and the fan, the air exiting the holes, and air impurities thereby settled into the liquid filtration medium.

2. A portable air scrubber device comprising, in combination:

a cylindrical chimney cap removably fitted atop an existing chimney;

a cylindrical fan housing removably affixed laterally to the chimney cap;

an axial fan disposed within the fan housing;

a horizontal hose removably extended from the chimney cap, the horizontal hose diametrically opposed to the axial fan;

an access disposed within the horizontal hose;

a removable filter disposed within the horizontal hose at the access;

a first flex joint removably disposed laterally within the horizontal hose;

a second hose removably extended from the flex joint;

a second flex joint removably extended from the second hose;

a connection hose removably extended from the second flex joint;

a small tank having a horizontally disposed removable top having a substantially laterally disposed inlet connected to the connection hose;

a plurality of spaced apart holes disposed upwardly around the small tank;

a laterally and downwardly disposed drain valve;

a replaceable liquid filtration medium;

a fan spaced apart from the top inlet, the fan directed toward the top inlet;

a spray mechanism disposed between the fan and the inlet, the spray mechanism comprising:

a canister disposed within the liquid filtration medium;

a manually operated hand pump pressurizing the canister;

a misting head disposed atop the canister, the misting head directed toward the inlet;

a large tank disposed in proximity to the small tank;

a mat disposed beneath the large tank;

a removable mesh disposed atop the top section;

a pair of opposed latches removably securing the mesh to the top section;

a plurality of spaced apart laterally disposed holes within the top section;

a bottom section removably disposed below the top section, the bottom section further comprising:

whereby unclean air entering the chimney cap is forced through the hoses and flex joints and into the tank by the axial fan, the air scrubbed by a flow of mist from the misting head and the fan, air impurities thereby settled into the liquid filtration medium, and scrubbed air exiting the holes.

* * * * *